Figure 1:
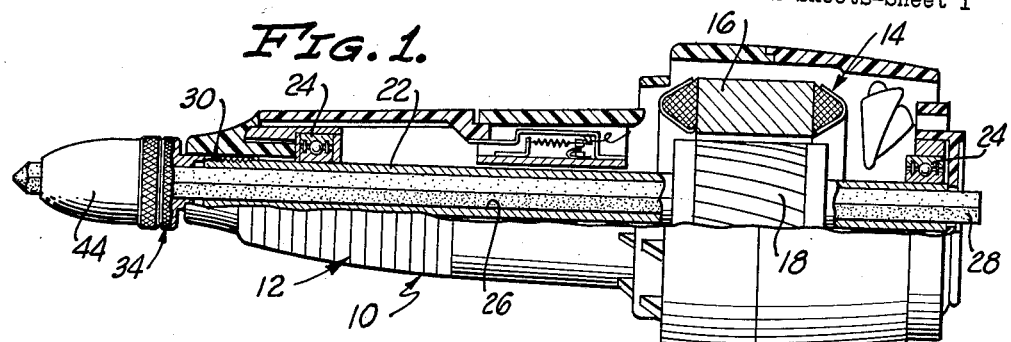

25804

Dec. 25, 1962     L. J. MISURACA     3,070,379

ELECTRICAL ERASING MACHINE

Filed May 22, 1961     2 Sheets-Sheet 1

INVENTOR.
LOUIS J. MISURACA
BY
Thomas Mahoney
ATTORNEY

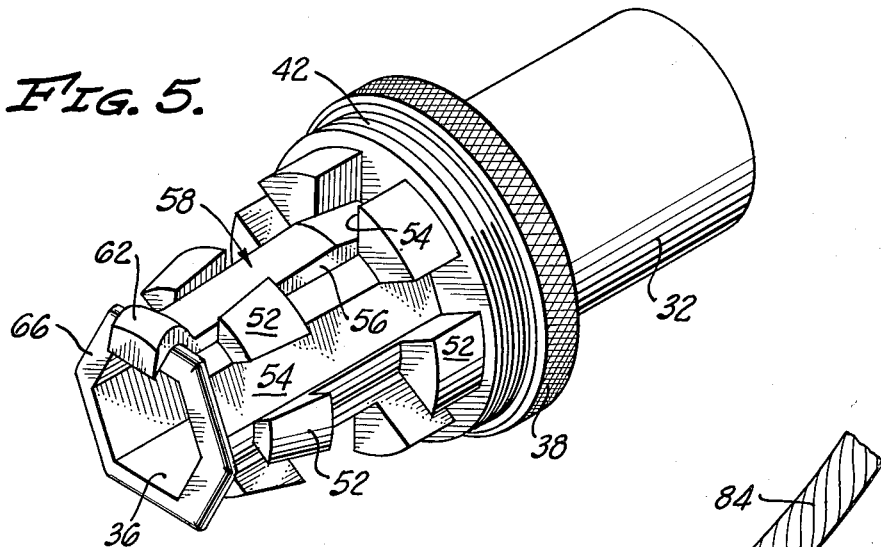
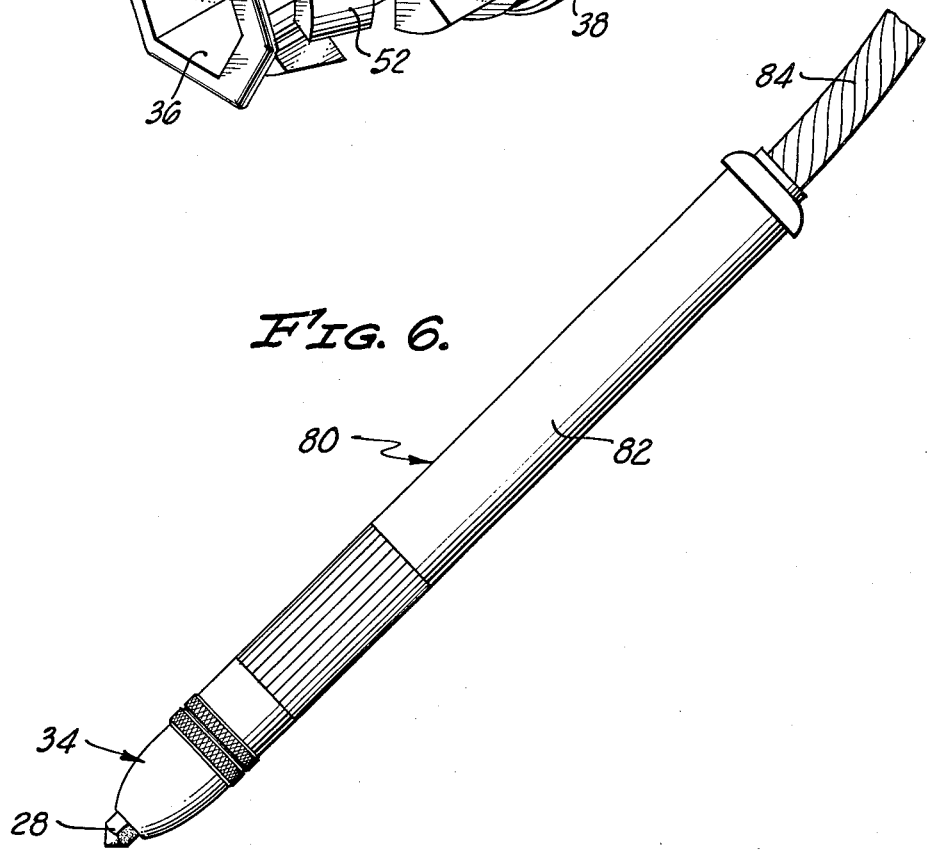

United States Patent Office 3,070,379
Patented Dec. 25, 1962

3,070,379
ELECTRICAL ERASING MACHINE
Louis J. Misuraca, 1359 Romulus Drive,
Glendale 5, Calif.
Filed May 22, 1961, Ser. No. 111,524
7 Claims. (Cl. 279—35)

There are on the market at the present time various types of motor driven erasing machines and, particularly, erasing machines adapted to rotate an elongated eraser and to permit the longitudinal position of said eraser to be adjusted with respect to the machine to bring a new portion thereof into operative position. However, prior art devices of this character, among which are those disclosed in my previously issued Patents No. 2,123,339 and No. 2,242,475, have all included relatively cumbersome chuck means adapted both to position the elongated eraser with respect to the machine and to lock said eraser with respect to the drive shaft thereof to prevent relative rotation between the drive shaft and the elongated eraser.

Thus, when the portion of the elongated eraser projecting beyond the extremity of the associated chuck is consumed, it is necessary to release the chuck to permit an additional portion of the elongated eraser to be withdrawn from the chuck. Such adjustment of the elongated eraser is not only a time-consuming task, but, during prolonged usage, the chuck tends to become somewhat distorted and the driving relationship between the cylindrical body of the elongated eraser and the chuck becomes somewhat ineffective, thus permitting slippage between chuck and said eraser. Furthermore, considerable effort is entailed in the closing of conventional chucks upon the eraser.

It is, therefore, an object of my invention to provide an electrical erasing machine which is characterized by the fact that it includes an elongated hollow drive shaft having a chuck mounted upon an extremity thereof, said drive shaft being adapted to receive an elongated eraser which is freely adjustable in said hollow drive shaft when said hollow drive shaft is immobile, said chuck being centrifugally actuated so that it will grip upon the adjacent portion of the elongated eraser when said drive shaft is rotated.

Another object of my invention is the provision of an electrical erasing machine of the aforementioned character wherein the elongated eraser is provided with an elongated driven surface and at least a portion of the eraser receiving bore provided by the chuck and drive shaft has a corresponding surface to establish a driving relationship between the chuck or drive shaft and the elongated eraser. Therefore, the driving relationship between the eraser and the electrical erasing machine does not depend solely upon engagement of the chuck jaws with the portion of the eraser in immediate proximity to said jaws.

A further object of my invention is the provision of an electrical erasing machine of the aforementioned character which includes a centrifugally actuated chuck, said chuck having a plurality of centrifugally actuated jaws, which, when the associated drive shaft mounting said chuck is rotated, are adapted to bite into the perimeter of said eraser to lock said eraser against said longitudinal movement with respect to said drive shaft.

However, when the drive shaft is immobile, the jaws of the chuck release the eraser permitting the user of an electrical erasing machine to withdraw a desired length of eraser from the chuck without the necessity for any previous adjustment of the chuck.

Figure 2:
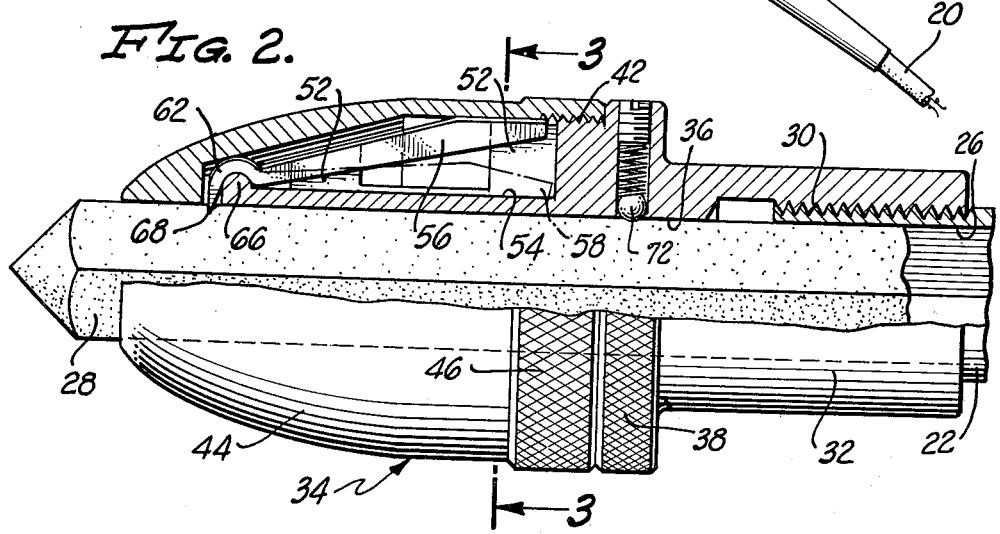
Figure 3:
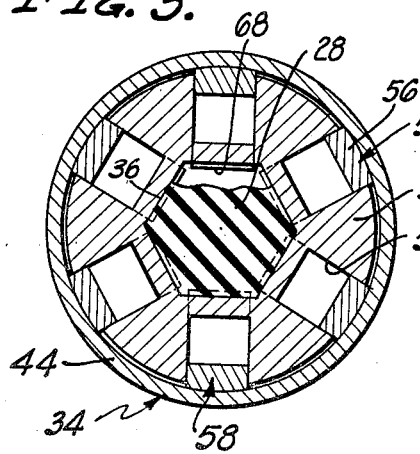
Figure 4:
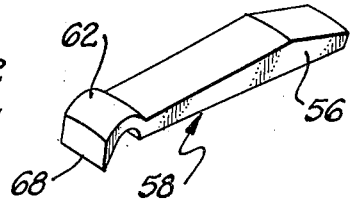

Other objects and advantages of my invention will be apparent from the following specification and the accompanying drawings, which are for the purpose of illustration only, and in which:

FIG. 1 is a longitudinal, sectional view of an electrical erasing machine;
FIG. 2 is an enlarged, fragmentary sectional view of the centrifugal chuck incorporated in said machine;
FIG. 3 is a transverse, sectional view taken on the broken line 3—3 of FIG. 2;
FIG. 4 is a perspective view of a chuck jaw;
FIG. 5 is a perspective view of the chuck jaw mount; and
FIG. 6 is an elevational view of an alternative embodiment of the invention.

Referring to the drawings, and particularly to FIGS. 1 and 2 thereof, I show an electrical erasing machine 10 constructed in accordance with the teachings of my invention and including an elongated housing 12, said housing incorporating an electrical motor 14 constituted by a field winding 16 and armature 18. An electrical cord 20 connects the motor 14 to a source of electrical current. The armature is mounted for rotation upon an elongated hollow drive shaft 22 whose opposite extremities, as best shown in FIG. 1 of the drawings, are disposed for rotation in ball bearings 24. The right-hand extremity of the drive shaft 22 opens to the right-hand extremity of the housing 12, as viewed in FIG. 1 of the drawings. The interior wall 26 of the drive shaft 22 is hexagonally shaped, as best shown in FIG. 2 of the drawings, to receive a correspondingly shaped elongated eraser 28. Therefore, as the drive shaft 22 is rotated, the eraser 28 is correspondingly rotated because of the corresponding configuration between the interior wall 26 of the drive shaft 22 and the perimeter of the eraser 28.

The left-hand extremity of the drive shaft 22 is provided with a thread 30, as best shown in FIG. 2 of the drawings, and there is engaged upon said thread the correspondingly threaded shank 32 of a centrifugal chuck 34. The remaining portion of the interior wall of the shank 32 of the chuck 34 is hexagonally shaped, as at 36, to conform to the configuration of the eraser 28.

However, it will be obvious to those skilled in the art that a sufficiently secure driving relationship between the drive shaft 22 and the eraser 28 can be established by hexagonally shaping either the interior wall of the shank 32 of the centrifugal chuck 34 or the hollow drive shaft 22 and it is not necessary that both the shank and the drive shall be hexagonally shaped.

The centrifugal chuck 34 is provided, as best shown in FIGS. 2 and 5 of the drawings, with an intermediate knurled collar 38 and a thread 42 immediately adjacent said collar for the reception of a jaw retaining cap 44 having a correspondingly knurled and threaded portion 46 adapted to engage the thread 42. The cap 44 is fabricated from hardened cold rolled steel in order to permit it to sustain the abrasive action to the eraser particles without undue attrition because of exposure to such abrasive particles.

The forward extremity of the centrifugal chuck body includes a plurality of radially extending alignment blocks 52 which define longitudinally extending recesses 54 in conjunction with corresponding pairs of alignment blocks for the reception of the elongated extremities 56 of the centrifugally actuated jaws 58 whose forward extremities 62 are mounted, as best shown in FIGS. 2 and 5 of the drawings, for pivotal movement about a hexagonally shaped radially extending abutment 66.

The abutment 66 is, as best shown in FIGS. 2 and 5 of the drawings, provided to receive the correspondingly shaped portion of the associated forward extremity 62 of a jaw 58. The forward extremity 62 is provided with a relatively sharp impingement portion 68 of a shape corresponding to the adjacent portion of the associated eraser 28 and adapted to bite into the perimeter of said associated portion of said eraser when the inner extremities 56 of the jaws 58 are swung outwardly against the cap 44 by rotation of the drive shaft 22 into the positions shown in FIGS. 2 and 3 of the drawings.

Engaged upon the perimeter of the elongated eraser 28, as best shown in FIG. 2 of the drawings, is a spring-biased ball detent 72 which is adapted, in a manner to be described in greater detail below, to prevent the elongated eraser 28 from inadvertently dropping out of the electrical erasing machine 10 when the centrifugal chuck 34 is inoperative. It will be noted that the cap 44 serves to retain the individual jaw 58 in operative relationship with the forward extremity of the chuck 34 and that the configuration of the impingement portion of each of the jaws should be shaped to conform to the perimetrical shape of the associated elongated eraser 28. For instance, if the elongated eraser had a square or ovoid cross section, the corresponding impingement portions of the associated centrifugally actuated jaws would be correspondingly shaped.

In utilizing the electrical erasing machine 10, an elongated eraser 28 is inserted from either open end of the drive shaft 22 until the opposite extremity of the eraser projects beyond the cap 44 of the centrifugal chuck 34 a desired distance. When the eraser 28 is inserted in the hollow drive shaft 22, the spring-biased ball detent 72 engages the same with a light pressure to prevent excessively free movement of the eraser 28.

Of course, the corresponding hexagonal configurations of the perimeter of the eraser 28 and the internal wall 26 of the drive shaft 22 prevent relative rotation between corresponding drive and driven surfaces of the drive shaft 22 and the eraser 28, respectively, thus establishing a driving relationship between the drive shaft 22 and eraser 28. In addition, the interior wall of the chuck 34 is hexagonally shaped as in 36, to conform to the hexagonal configuration of the eraser 28. However, it is not intended to limit the configuration of the eraser 28 and the corresponding configuration of the interior wall of the drive shaft to any particular configuration, since it is obvious that other shapes may be utilized such as ovoid, square, splined and the like.

Furthermore, the formation of the eraser and corresponding portions of either the chuck or drive shaft will establish an adequate driving relationship between the motor 14 and the eraser 28 and it is not necessary that both the chuck and drive shaft be so configured or that the entire length of the drive shaft be so formed. In any event, the user of the electrical erasing machine 10 may freely adjust the eraser 28 without the necessity for any adjustment of the chuck 34.

However, initiation of rotation of the drive shaft 22 causes the inner extremities 56 of the jaws 58 to fly outwardly and to pivot the impingement portion 68 of said jaws 58 inwardly to cause them to bite into the perimeter of the associated portion of the elongated eraser 28, thus locking the eraser 28 against relative longitudinal movement with respect to the centrifugal chuck 34 in the associated drive shaft 22. Once rotation of the chuck 34 and drive shaft 22 is terminated, the jaws 58 return to the inoperative positions, shown in FIGS. 2 and 5 of the drawings, releasing the eraser 28 and permitting free longitudinal adjustment thereof. In this manner, the necessity for the tedious chuck adjustment of prior art devices has been eliminated. Furthermore, a solid driving relationship between the eraser and the drive shaft is established by correspondingly configuring the perimeter of the drive shaft and the interior wall of either the drive shaft and chuck or both.

Shown in FIG. 6 of the drawings is an alternative embodiment of my invention which consists of a remotely driven elongated erasing machine 80 having an elongated pencil-like housing 82 incorporating a centrifugally actuated chuck 34. The drive shaft, not shown, of the erasing machine 80 is of the same construction as the drive shaft 22 of the previously disclosed embodiment of the invention and is adapted to be driven by a flexible shaft 84 connected to a remotely positioned motor, not shown. The relatively small dimensions and weight of the erasing machine 80 facilitate its utilization in applications where the size of the previously disclosed embodiment of the invention would militate against its effective utilization.

I thus provide by my invention an electrical erasing machine which is characterized by the elimination of the tedious adjustment of the elongated eraser characteristic of prior art devices and by the establishment between the eraser and the machine of a positive driving relationship which obviates the possibility of relative rotation between the eraser and the drive shaft of the machine.

Free longitudinal movement by the eraser with respect to the machine is possible when the machine is inoperative. However, when the drive shaft of the machine is rotated, the centrifugal chuck associated therewith is immediately energized to lock the eraser against longitudinal movement with respect to the machine.

I claim:

1. In an electrical erasing machine adapted, when it is not operating, to permit the free lineal adjustment of an eraser having an elongated driven surface thereupon to establish a driven relationship with said machine, the combination of: a housing; a motor in said housing including a hollow drive shaft; and a chuck mounted on said drive shaft having a hollow shank communicating with said hollow drive shaft, said hollow shank and said hollow shaft defining a bore for the reception of said eraser, said bore having an elongated driving surface on the wall thereof adapted to engage the corresponding driven surface of said eraser in driving and sliding relationship, said chuck incorporating a plurality of centrifugally actuated jaws engageable with the perimeter of said eraser during operation of said machine to restrict relative lineal movement between said driven surface of said eraser and said driving surface of said bore.

2. In an electrical erasing machine adapted, when it is not operating, to permit the free lineal adjustment of an eraser having an elongated driven surface thereupon to establish a driven relationship with said machine, the combination of: a housing; a motor in said housing including a hollow drive shaft; and a chuck mounted on said drive shaft having a hollow shank communicating with said hollow drive shaft, said hollow shank and said hollow shaft providing a bore for the reception of said eraser, said hollow shank having an elongated driving surface on its inner wall engageable with the corresponding elongated driven surface of said eraser to permit said eraser to be received in said bore in driving and sliding relationship, said chuck having centrifugally actuated jaw means engageable with said eraser to prevent relative lineal movement between said eraser and said chuck during rotation of said chuck by said motor.

3. In an electrical erasing machine for an elongated eraser having an elongated polygonal body providing corresponding elongated driving surfaces thereupon adapted to establish a driving relationship with said machine, the combination of: a housing; a motor in said housing including a hollow drive shaft; and a chuck having a hollow shank communicating with said hollow drive shaft, said hollow drive shaft and said hollow shank together providing a bore for the reception of said eraser with said bore having an elongated polygonal portion providing driving surfaces corresponding with the driven surfaces of said eraser, said bore being adapted to receive said eraser in driving and sliding relationship and said chuck having centrifugal jaw means mounted thereupon energizable by rotation of said chuck of said shaft.

4. In an electrical erasing machine for an elongated eraser having an elongated polygonal body providing corresponding elongated driving surfaces thereupon adapted to establish a driving relationship with said machine, the combination of: a housing; a motor in said housing including a hollow drive shaft; and a chuck having a hollow shank communicating with said hollow drive shaft, said hollow drive shaft and said hollow shank together providing a bore for the reception of said eraser with said bore having an elongated polygonal portion providing driving surfaces corresponding with the driven surfaces of said eraser, said bore being adapted to receive said eraser in driving and sliding relationship and said chuck having centrifugal jaw means mounted thereupon energizable by rotation of said chuck on said shaft, said chuck incorporating a detent engageable with the perimeter of said eraser and adapted to prevent involuntary lineal movement of said eraser in said bore when said jaw means are inoperative.

5. In an electrical erasing machine adapted to receive an elognated eraser and rotatably drive the same, said eraser having an elongated polygonal body providing driven surfaces thereupon which permit the free lineal adjustment of said eraser in said machine when said machine is inoperative, the combination of: an elongated housing; a motor in said housing incorporating an elongated hollow drive shaft; and a chuck mounted on said drive shaft having a hollow shank communicating with said hollow drive shaft, said hollow drive shaft and said hollow shank together defining an eraser receiving bore for the reception of said eraser and said bore having an elongated polygonal portion providing driving surfaces corresponding to the polygonal body of said eraser to permit said bore to receive said eraser in driving and sliding relationship, said chuck having a plurality of elongated, centrifugally actuated jaws adapted to engage the perimeter of said eraser when energized by rotation of said chuck on said shaft, said chuck incorporating an enclosure cap adapted to enclose said jaws.

6. In an electrical erasing machine adapted to receive an elongated eraser and rotatably drive the same, said eraser having an elongated polygonal body providing driven surfaces thereupon which permit the free lineal adjustment of said eraser in said machine when said machine is inoperative, the combination of: an elongated housing; a motor in said housing incorporating an elongated hollow drive shaft and a chuck mounted on said drive shaft having a hollow shank communicating with said hollow drive shaft, said hollow drive shaft and said hollow shank together defining an eraser receiving bore for the reception of said eraser and said bore having an elongated polygonal portion providing driving surfaces corresponding to the polygonal body of said eraser to permit said bore to receive said eraser in driving and sliding relationship, said chuck having a plurality of elongated, centrifugally actuated jaws adapted to engage the perimeter of said eraser when energized by rotation of said chuck on said shaft, said chuck incorporating an enclosure cap adapted to enclose said jaws, said jaws being pivotally mounted on said shank and having gripping portions on their forward extremities and elongated inner extremities which are pivoted outwardly by centrifugal force to urge said gripping portions against the perimeter of said eraser during rotation of said chuck on said shaft.

7. In a centrifugal chuck adapted to be utilized in conjunction with an electrical erasing machine having an elongated hollow shaft for the reception of a correspondingly elongated eraser which incorporates an elongated driven surface on its perimeter to permit free sliding movement for adjustment of said eraser in said shaft when said chuck is inoperative, the combination of: an elongated hollow shank defining a bore incorporating an elongated driving surface conforming to the driven surface of said eraser to permit free lineal movement of said eraser relative to said chuck when said chuck is inoperative; a plurality of jaws pivotally mounted on the forward extremity of said shank, said jaws having elongated bodies whose forward extremities incorporate eraser gripping portions adapted to prevent free lineal movement of said eraser in said shank and whose rear extremities are constituted by elongated arms providing centrifugal masses urgeable outwardly in a direction away from the axis of said shank during rotation of said chuck on said shaft; and an enclosure cap mounted on said shank and enclosing said centrifugally actuated jaws.

References Cited in the file of this patent
UNITED STATES PATENTS

| | | |
|---|---|---|
| 2,143,124 | Hall | Jan. 10, 1939 |
| 2,207,621 | Hite | July 9, 1940 |
| 2,734,139 | Murphy | Feb. 7, 1956 |
| 2,784,977 | Dinsmore | Mar. 12, 1957 |